United States Patent
Bobinski et al.

(10) Patent No.: US 12,192,367 B2
(45) Date of Patent: Jan. 7, 2025

(54) SUPPORTING THE DECRYPTION OF ENCRYPTED DATA

(71) Applicants: Mike Bobinski, Bonn (DE); Jürgen Pabel, Cologne (DE)

(72) Inventors: Mike Bobinski, Bonn (DE); Jürgen Pabel, Cologne (DE)

(73) Assignee: Deutsche Post AG, Bonn (DE)

( * ) Notice: Subject to any disclaimer, the term of this patent is extended or adjusted under 35 U.S.C. 154(b) by 2276 days.

(21) Appl. No.: 14/927,582

(22) Filed: Oct. 30, 2015

(65) Prior Publication Data

US 2016/0149705 A1 May 26, 2016

Related U.S. Application Data

(63) Continuation of application No. PCT/EP2014/065613, filed on Jul. 21, 2014.

(30) Foreign Application Priority Data

Aug. 12, 2013 (DE) ...................... 10 2013 108 714.0

(51) Int. Cl.
| | | |
|---|---|---|
| *H04L 9/32* | (2006.01) | |
| *H04L 9/08* | (2006.01) | |
| *H04L 9/40* | (2022.01) | |

(52) U.S. Cl.
CPC .......... *H04L 9/3228* (2013.01); *H04L 9/0819* (2013.01); *H04L 9/0863* (2013.01);
(Continued)

(58) Field of Classification Search
CPC ... H04L 9/3228; H04L 9/0819; H04L 9/0863; H04L 9/321; H04L 63/0838; H04L 2463/062
See application file for complete search history.

(56) References Cited

U.S. PATENT DOCUMENTS

| | | | | | |
|---|---|---|---|---|---|
| 4,924,515 | A | * | 5/1990 | Matyas | ................. H04L 9/0643 |
| | | | | | 380/280 |
| 6,092,201 | A | * | 7/2000 | Turnbull | ............... H04L 9/3268 |
| | | | | | 380/278 |

(Continued)

FOREIGN PATENT DOCUMENTS

| | | |
|---|---|---|
| CN | 103428001 A | 12/2013 |
| DE | 10 2012 222 995 B3 | 10/2013 |

OTHER PUBLICATIONS

De-Mail, De-Mail Sicherer elektronischer Nachrichtenverkehr—einfach und nachweisbar, webpage, Mar. 12, 2012, 27 pages, Germany https://www.bsi.bund.de/SharedDocs/Downloads/DE/BSI/Egovernment/De_Mail/De-Mail-Broschuere.pdf?_ blob=publicationFile.

*Primary Examiner* — Saleh Najjar
*Assistant Examiner* — Devin E Almeida
(74) *Attorney, Agent, or Firm* — Reinhart Boerner Van Deuren P.C.

(57) ABSTRACT

A first installation stores a secret key of a user and a second installation provides encrypted data for the user. In order that a user apparatus can decrypt the encrypted data, the apparatus creates a one-time password, encrypts the one-time password by means of a public key of the first installation and causes the second installation to retrieve the secret key of the user from the first installation by means of the encrypted one-time password and a key identification allocated to the user in the second installation. The first installation decrypts the one-time password, searches for the secret key based on the key identification, encrypts it with the one-time password and transmits the encrypted secret key to the apparatus via the second installation. There, the secret key of the user is decrypted by means of the one-time password and is used for decrypting the encrypted data.

26 Claims, 3 Drawing Sheets

(52) U.S. Cl.
CPC .......... *H04L 9/321* (2013.01); *H04L 63/0838* (2013.01); *H04L 2463/062* (2013.01)

(56) References Cited

U.S. PATENT DOCUMENTS

| | | | | |
|---|---|---|---|---|
| 6,160,891 | A * | 12/2000 | Al-Salqan | H04L 9/0643 713/165 |
| 7,373,330 | B1 * | 5/2008 | Klebe | G06Q 10/10 380/200 |
| 8,213,620 | B1 * | 7/2012 | Sussland | H04L 9/0894 380/278 |
| 8,397,084 | B2 * | 3/2013 | Ranade | H04L 9/0894 713/193 |
| 8,458,494 | B1 * | 6/2013 | Bogorad | H04L 9/30 380/282 |
| 2002/0126850 | A1 | 9/2002 | Allen et al. | |
| 2005/0050577 | A1 * | 3/2005 | Westbrook | H04N 5/76 725/134 |
| 2007/0011724 | A1 * | 1/2007 | Gonzalez | G06F 21/79 726/4 |
| 2007/0280483 | A1 * | 12/2007 | Fu | H04L 9/0822 380/286 |
| 2009/0080662 | A1 * | 3/2009 | Thibadeau | G06F 21/31 380/286 |
| 2009/0086977 | A1 * | 4/2009 | Berggren | H04L 9/3263 380/279 |
| 2009/0202080 | A1 * | 8/2009 | Mizuno | H04L 9/0833 380/279 |
| 2010/0037050 | A1 * | 2/2010 | Karul | H04L 63/0428 713/167 |
| 2011/0202756 | A1 * | 8/2011 | West | H04L 51/08 713/152 |
| 2011/0293098 | A1 * | 12/2011 | Fu | H04L 9/0894 380/286 |
| 2013/0254537 | A1 * | 9/2013 | Bogorad | H04L 9/0822 713/165 |
| 2013/0254558 | A1 | 9/2013 | Bogorad | |
| 2013/0287210 | A1 * | 10/2013 | Matsuda | H04L 9/0894 380/44 |
| 2014/0101451 | A1 * | 4/2014 | Chan | G06F 16/20 713/171 |
| 2014/0164776 | A1 * | 6/2014 | Hook | G06F 21/6218 713/171 |
| 2014/0229737 | A1 * | 8/2014 | Roth | H04L 9/0618 713/176 |
| 2015/0200774 | A1 * | 7/2015 | Le Saint | H04L 63/061 713/171 |

* cited by examiner

SUPPORTING THE DECRYPTION OF ENCRYPTED DATA

CROSS-REFERENCE TO RELATED PATENT APPLICATIONS

This patent application is a continuation of PCT/EP2014/065613, filed Jul. 21, 2014, which claims priority to German Application No. 10 2013 108 714.0, filed Aug. 12, 2013, the entire teachings and disclosure of which are incorporated herein by reference thereto.

FIELD OF THE INVENTION

This invention relates, amongst other things, to methods, apparatuses, systems, programs and storage media for supporting the decryption of encrypted data.

BACKGROUND TO THE INVENTION

Nowadays, data can be sent digitally, for example as an email. For various reasons, conventional emailing is not suitable for confidential information. On the one hand, neither the sender nor the recipient can be unequivocally identified. This means that the recipient of an email cannot be sure that the sender is, in fact, the person or institution who or which is specified as the sender. On the other hand, the information is openly transmitted, which means that wrongly sent emails can be read by the incorrect recipient. In addition, the provider of the email function, via the server of which the email is transmitted, can take note of the information in the email.

The content of electronic messages can be protected by an end-to-end encryption, so that the message cannot be read by any third party when being conveyed from the sender to the recipient. Here, a sender must cryptographically encrypt a message or a part of a message and the recipient must decrypt the message. The encryption can be a symmetric encryption; in this case encryption and decryption are based on the same key. Alternatively, the encryption can be an asymmetric encryption; in this case the encryption can be based on a public key of a key pair and the decryption can be based on the private key of the key pair. Traditionally, the recipient has to manage and protect his/her key or keys independently, the latter both from a loss as well as from unauthorised reading-out by a third party. In addition, the recipient has to make the key required to encrypt the message accessible to the sender. Moreover, the installation of software modules and possibly additional devices, such as card readers, are required on the part of the recipient.

A trust centre can support the generation and management of keys. In particular, a trust centre can offer recipients a secure storage of keys, in order to prevent the loss of a key. For this purpose, however, the recipient must not only enter into a contractual relationship with an email provider or another message deliverer but additionally must enter into another contractual relationship with the trust centre. A sender may have to retrieve keys for a plurality of recipients from a plurality of trust centres and make sure that he/she is in each case using the correct key of the recipient when encrypting a message. A trust centre can additionally issue certificates for electronic signatures to certify the identity of a communication partner.

In one variant, a message deliverer can act as a complete provider for secure message transmission. The applicant provides such a process with the E-Postbrief for example. Both the recipient and the sender then require only one contract with the message deliverer and they are provided with all necessary functions for secure communication. A trust centre can create a key for a user which is then managed by the message deliverer. A sender can obtain the required keys from the message deliverer and also deliver messages there. In order that no technical or organisational measures are required at all on the part of the recipient, the encrypted messages can already be decrypted on the part of the message deliverer on a server of the message deliverer when the message is retrieved by the recipient and transmitted to the recipient via a secure connection. By having high requirements regarding identification of the participants and by providing an address qualification service, the message transmitter can also determine or check the recipient's address for the sender and ensure correct delivery.

SUMMARY OF THE INVENTION

One of the objects of the invention consists in supporting the decryption of encrypted data in an alternative way to existing approaches. Another object of the invention consists in enabling encrypted data to be decrypted in a particularly user-friendly and, at the same time, particularly secure manner.

The object is achieved by a method according to Claim 1, an apparatus according to Claim 3, a program according to Claim 5 and a storage medium according to Claim 6, a method according to Claim 7, an apparatus according to Claim 13, a program according to Claim 15, a storage medium according to Claim 16 and a system according to Claim 17. Further embodiments can be derived from the dependent claims.

For a first aspect it is assumed for an exemplary embodiment of a method, performed by an apparatus, that a first installation is configured to provide a secret key of a user of the apparatus and that a second installation is configured to provide data for the user. The method comprises logging on to the second installation with authentication of the user. The method further comprises receiving encrypted data from the second installation. The method further comprises creating a one-time password. The method further comprises encrypting the one-time password by means of a public key of the first installation. The method further comprises transmitting the encrypted one-time password to the second installation and causing the second installation to retrieve the secret key of the user from the first installation by means of the encrypted one-time password and a key identification allocated to the user in the second installation. The method further comprises receiving the secret key of the user, which was encrypted by the first installation with the one-time password, from the second installation. The method further comprises decrypting the secret key of the user by means of the one-time password. The method further comprises decrypting the encrypted data by means of the secret key of the user.

For a second aspect it is assumed for an exemplary embodiment of a method, performed by an apparatus of a first installation, that a second installation is configured to provide data for a user. The method comprises receiving a key identification and a one-time password, which was generated by an apparatus of a user and encrypted with a public key of the first installation, from a second installation which stores an allocation between users and key identifications. The method further comprises reading a secret key of the user, which is encrypted with the key identification, based on the key identification from a memory of the first installation. The method further comprises decrypting the encrypted secret key of the user by means of the key identification. The method further comprises decrypting the encrypted one-time password by means of a private key of the first installation. The method further comprises encrypting the secret key of the user with the one-time password. The method further comprises transmitting the secret key of the user encrypted with the one-time password to the second installation for forwarding to the apparatus of the user, in order to enable the user to decrypt encrypted data received from the second installation.

Therefore, the invention makes provision for certain exemplary embodiments for data and a secret key for decrypting the data to be provided separately from one another. The key is provided by a first installation and the data is provided by a second installation. Nevertheless, the apparatus of a user only communicates directly with the second installation. The second installation itself only has an allocation of the user to a key identification. The user can be identified in any way for this allocation, for example by means of a user name specified during the login procedure or a user address for electronic messages. Encrypted data for the user is transmitted to the user apparatus from the second installation in encrypted form. The user apparatus generates a one-time password, encrypts it with a public key of the first installation and passes it on to the second installation. The second installation passes the encrypted one-time password together with a key identification stored for the user on to the first installation. The first installation decrypts the one-time password, retrieves a stored, encrypted secret key of the user through the use of the key identification, decrypts it with the key identification and encrypts it with the one-time password. The first installation passes the secret key of the user newly encrypted in this way to the user apparatus via the second installation. After decrypting the secret key with the one-time password, the user apparatus can now decrypt the encrypted data.

A possible advantage of the invention lies in the fact that the user himself/herself does not have to keep a secret key available in the user apparatus. As a result, the user does not need to ensure that the secret key is kept safe from access by others and that it is not lost. In addition, the user can therefore access the same centrally stored secret key possibly via a plurality of apparatuses. A further possible advantage of the invention lies in the fact that, nevertheless, the user only has to communicate with one installation; if the operator of the second installation acts as complete service provider, then in certain embodiments the user also only requires one contract with this service provider. A further possible advantage of the invention lies in the fact that with the use of a one-time password for conveying the secret key in certain embodiments no user input is required for generating the password. In this way, the approach could be particularly conveniently developed for the user and be independent of the login procedure, by means of which a user logs on to the second installation in order to retrieve data.

For particularly confidential information, there can be particularly high requirements on a safeguard that only the intended recipient can use the provided information. This can, for example, relate to professional confidentiality of certain professional groups, such as doctors or lawyers, who are subject to special obligations to maintain confidentiality. A further possible advantage of the invention lies in the fact that by means of the separation between provision of data and provision of keys, despite the user accessing one single installation, a particularly high level of security can be achieved in terms of confidentiality. That is to say, no installation stores both the encrypted data and the secret key required for the decryption—not even in encrypted form. The decryption takes place exclusively in the sphere of control of the recipient, i.e. on the user apparatus. The one-time password can ensure that the secret key of the user is also protected during transmission to the user via the second installation. Since the one-time password itself is encrypted during transmission to the first installation via the second installation, also at no time does the second installation obtain access to the one-time password.

An exemplary apparatus according to the invention and according to the first aspect comprises means for performing the method according to the invention and according to the first aspect. The apparatus can be, for example, a user end device or a module for a user end device.

An exemplary apparatus according to the invention and according to the second aspect comprises means for performing the method according to the invention and according to the second aspect. The apparatus can be, for example, a server or a module for a server. The server can, in turn, be part of an installation, such as a trust centre, for example.

The means of the apparatus according to the first or second aspect could in each case comprise hardware and/or software components. In an exemplary embodiment, the means could just comprise a circuit, in which corresponding functions are implemented via hardware. In another exemplary embodiment, the means could comprise at least one processor and at least one memory with a suitable program.

Thus, for the first and the second aspect, respectively, an exemplary embodiment of an apparatus according to the invention comprises at least one processor and at least one memory, wherein a program comprising program instructions is stored in the memory, and wherein the memory and the program are configured to, with the processor, at least cause the apparatus to perform the method according to the invention according to the first aspect or according to the second aspect, when the program is executed on the processor. The apparatus is, for example, configured softwarewise to be able to execute the method. Configured softwarewise should in particular be understood as the preparation of the apparatus, which is necessary in order to be able to execute a method, for example in the form of a program, on the processor.

A processor should, amongst other things, be understood as one or more control units, microprocessors, microcontrol units such as microcontrollers, Digital Signal Processors (DSPs), Application-Specific Integrated Circuits (ASICs) or Field Programmable Gate Arrays (FPGAs).

A memory is, for example, a program memory and/or a main memory of the processor. A program memory should, amongst other things, be understood as a non-volatile memory and a main memory as a volatile or non-volatile memory, in particular a memory with random access (random access memory RAM) and/or a flash memory. Non-volatile memories are e.g. memories with random access (RAM) such as e.g. NOR flash memories or with sequential access such as e.g. NAND flash memories and/or memories with read-only access (ROMs) such as e.g. EPROM, EEPROM or ROM memories. The memory can be formed as tangible memory, for example.

For the first and the second aspect, respectively, an exemplary embodiment of a program according to the invention comprises program instructions, wherein the program instructions cause an apparatus to perform the method according to the invention according to the first aspect or according to the second aspect, when the program is executed by the processor. A program can be distributed, for example, via a network, such as a local area network, a wide area network, a virtual network, a radio network, such as a mobile radio network, another telephone network and/or the Internet. A program can at least partly be software and/or firmware of a processor. The program according to the invention is stored for example in a memory of the apparatus according to the invention according to the first or second aspect. It should be understood that the concept of a program can in each case also be understood as a combination of a plurality of programs.

For the first and second aspect, respectively, an exemplary embodiment of a storage medium according to the invention stores a program according to the invention according to the first or second aspect. The storage medium is, for example, a computer-readable storage medium which contains the program according to the invention and, for example, is formed as a magnetic, electric, electromagnetic, optical and/or other type of storage medium. The storage medium can in particular be a physical and/or tangible storage medium. The storage medium is, for example, portable or permanently installed in an apparatus. "Computer-readable" should in particular be understood such that the storage medium can be read and/or written to by a computer or a data processing apparatus, for example by a processor. The storage medium is, for example, a program memory of a processor.

In an exemplary embodiment, a system according to the invention comprises a first installation having an apparatus according to the second aspect and a memory for storing a plurality of secret keys of users encrypted with key identifications. The system can additionally comprise any other components, for example the second installation and/or an apparatus according to the first aspect.

In an exemplary embodiment, the apparatus according to the first aspect is caused by program instructions stored permanently in a local memory of the apparatus and executed by a processor of the apparatus to perform the method. In an exemplary embodiment, the apparatus according to the first aspect is caused by program instructions received via a browser and executed by a processor of the apparatus to perform the method. The program instructions can, for example, be provided by the second installation in the form of a Java applet or another application and only temporarily stored in a working memory in the apparatus. This may have the advantage that an installation of a program with the program instructions and updates of an installed program is not required.

For the second aspect, in an exemplary embodiment the secret key of the user encrypted with the key identification can be stored in the memory of the first installation with an allocation to a value cryptographically derived from the key identification. In this case, firstly a value could be cryptographically derived for a received key identification in the first installation. The secret key of the user encrypted with the key identification could then be read through the use of the cryptographically derived value of the received key identification. Storing the encrypted secret key with an allocation to a cryptographically derived value of the key identification can provide the advantage that the secret key can still not be readily retrieved from a memory of the first installation only with knowledge of the key identification. An example of a cryptographically derived value is a hash value which is obtained by means of a hash function.

For the second aspect, in an exemplary embodiment a stored, encrypted secret key of a user can be generated by the apparatus of the first installation beforehand when a request is received from the second installation to generate a secret key for a user. The apparatus of the first installation can then generate a secret key for a user, in particular independent of a user input. The apparatus of the first installation can also generate a key identification for the secret key for the user. The apparatus of the first installation can encrypt the secret key for the user with the key identification and store the encrypted secret key in the first installation for retrieval by a apparatus of the user via the second installation. Generating a secret key for a user independent of user inputs can provide the advantage that no communication with the user is necessary to generate the key.

Of course, this special generation of a secret key for a user by a apparatus of a first installation is also to be regarded as a separate invention.

For the second aspect, in an exemplary embodiment the key identification can be transmitted to the second installation, in order to store the key identification with an allocation to a user. This can provide the advantage that the first installation does not need to receive any direct information at all about the respective user for a request for a secret key for a user.

For the second aspect, in an exemplary embodiment the apparatus of the first installation, as part of the process of generating a secret key, can cryptographically derive a value from the generated key identification, store the cryptographically derived value in the memory of the first installation with an allocation to the secret key encrypted with the key identification and delete the key identification in the first installation. A hash value can again be used as the cryptographically derived value, for example.

The secret key of the user can, for example, be a key for symmetric encryption or, for example, the private key of a key pair for asymmetric encryption.

For the second aspect, in the latter case the apparatus of the first installation can furthermore generate a public key for the user. The public key can then exclusively be stored in the first installation. Alternatively, it could be transmitted to the second installation for storing exclusively in the second installation. Storing the public key in the second installation could have the advantage that the public key can be accessed more easily, for example when another user wants to send data encrypted with the public key to the user. In this way, public keys generated by different first installations could also be stored in the second installation. Since the public key is not secret, it can readily be stored in the second installation and kept available for retrieval. The public key could again only be indirectly, and hence more elaborately, retrieved from the first installation via the second installation, since there is preferably no allocation of the user to the stored keys in the first installation. Further alternatively, the public key of the user could be stored in the first installation and additionally transmitted to the second installation for storing in the second installation. This can provide the advantage that the public key can easily be directly retrieved from the second installation, while a backup copy, however, is available in the first installation.

The encrypted data can be of any type and supplied to the second installation earlier by any party. In an exemplary embodiment, the encrypted data was encrypted by an apparatus of a third party and supplied to the second installation. In this context, this data can be encrypted parts or attachments of electronic messages, for example. In another exemplary embodiment, the encrypted data was encrypted by an apparatus of the user and supplied to the second installation. In this context, the data can be data which has been outsourced in order to save local storage capacities and/or in order to enable data to be accessed centrally.

Further advantageous exemplary embodiments of the invention can be derived from the following detailed description of some exemplary embodiments of this invention, in particular in conjunction with the figures. The figures, however, are only to serve for the purpose of clarification and not for determining the scope of protection of the invention. The figures are not drawn to scale and are only supposed to reflect the general concept of this invention by way of example. In particular, features contained in the figures are in no way to be considered as mandatorily required parts of this invention.

DETAILED DESCRIPTION OF SOME EXEMPLARY EMBODIMENTS OF THE INVENTION

This invention is described below by means of exemplary embodiments which support the decryption of encrypted data.

Figure 1:
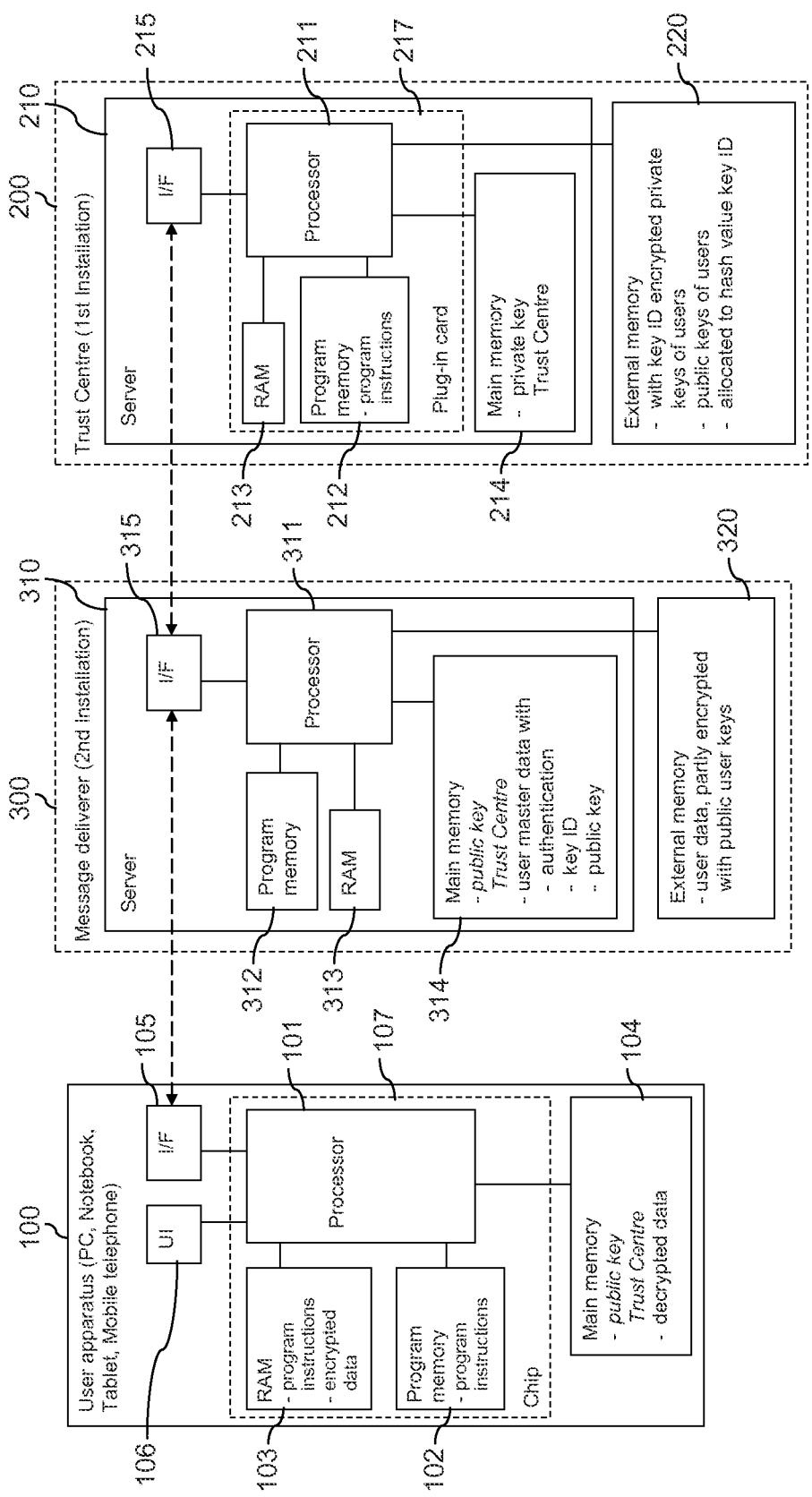
FIG. 1 shows a block diagram of an embodiment of a system according to the invention.

FIG. 1 shows a block diagram of an exemplary embodiment of a system according to the invention. The system comprises an apparatus 100, a first installation 200 and a second installation 300.

The apparatus 100 is a user apparatus, for example a personal computer (PC), a notebook, a tablet computer, a mobile telephone or any other device.

The apparatus 100 comprises a processor 101 and, connected to the processor 101, a program memory 102, a working memory in the form of a RAM 103, a main memory 104, a communications interface (I/F) 105 and a user interface (UI) 106.

The processor 101 could be a microprocessor. It could also be embedded in an integrated circuit (IC), for example together with a memory. By way of example, a chip 107 is indicated which could contain a circuit with the processor 101, the program memory 102 and the working memory 103.

The program memory 102 stores programs with program instructions permanently, i.e. usually until a user deletes them. The programs comprise at least one browser program, for example. The working memory 103 can, for example, be used for temporarily storing various information, such as intermediate data, programs or individual program instructions or data to be processed. The main memory 104 can be used for permanently storing user data and other data, for example electronic messages downloaded from a mailbox and their unencrypted or decrypted attachments.

The processor 101 is configured to execute programs and thereby cause the apparatus 100 to carry out certain actions. For this purpose, the processor 101 can, for example, access program instructions stored in the program memory 102 or access program instructions which are only stored in the working memory 103. In addition, any information can be stored temporarily in the working memory 103 by the processor 101.

The communications interface 105 can be any interface which enables data to be exchanged between the user apparatus 100 and the second installation 300, in particular, but not necessarily, via the Internet. It can be a wireless interface which enables access to the Internet, for example via a Wireless Local Area Network (WLAN) or via a mobile radio network. It can also be a wired interface which enables access to the Internet via a cable, such as via a DSL connection or a Local Area Network (LAN).

The user interface 106 can comprise any components for data input by a user and for presenting data, such as a keyboard, a mouse, a microphone, a display, a touch-screen and/or a loudspeaker, etc. Of course, such components can be completely or partly integrated into the apparatus 100 in certain embodiments, but equally could be connected to the apparatus 100 via cables or wirelessly.

The first installation 200 can be a state-certified trust centre, by way of example.

The installation 200 comprises a server 210 and an external memory 220.

The server 210 comprises a processor 211 and, connected to the processor 211, a program memory 212, a working memory in the form of a RAM 213, a main memory 214 and a communications interface (I/F) 215.

The processor 211 could be a microprocessor. It could also be embedded in an integrated circuit, for example together with a memory. By way of example, a plug-in card 217 is indicated which contains a circuit with the processor 211, the program memory 212 and the working memory 213.

The program memory 212 permanently stores programs with program instructions which are provided for operating the server 210. The working memory 213 is configured to temporarily store information. The main memory 214 is configured to store a private key of a key pair of the trust centre.

The processor 211 is configured to execute programs from the program memory 212 and thereby cause the first installation 200 to carry out certain actions. In this connection, any information can be stored temporarily in the working memory 213 by the processor 211.

The communications interface 215 can be any interface which enables data to be exchanged between the first installation 200 and the second installation 300, by way of example, but not necessarily, via the Internet. It can again be a wireless interface or a wired interface.

The external memory 220 can be configured to store data of a database. The database can be designed in such a way that in each case a data record can be accessed via a hash value of a key identification. The data allocated to a hash value comprises a public key and a private key encrypted with the key identification, wherein the public key and the private key form a key pair for a specific user. The private key is an exemplary secret key of a user. The user cannot be identified in the installation 200.

Of course, the installation 200 can also be assembled in any other way. Thus, the memory 220 could also be integrated into the server 210, or the main memory 214 and the external memory 220 could be combined either within the server 210 or outside the server 210. The external memory 220 could also be provided by another server.

The second installation 300 can, for example, be an installation of a message deliverer.

The installation 300 also comprises a server 310 and an external memory 320.

The server 310 comprises a processor 311 and, connected to the processor 311, a program memory 312, a working memory in the form of a RAM 313, a main memory 314 and a communications interface (I/F) 315.

The program memory 312 is a storage medium which stores programs which are provided for operating the server 310. A program could also in particular comprise data for a website provided by the message deliverer. The working memory 313 is configured to temporarily store information. The main memory 314 is configured to store user master data. Additionally, the main memory 314 could also store a public key of the trust centre 200, in the event that provision is not made for it to be stored in the main memory 104 of user apparatuses 100.

The processor 311 is configured to execute programs from the program memory 312 and thereby cause the second installation 300 to carry out certain actions. In this connection, any information can be stored temporarily in the working memory 313 by the processor 311.

The communications interface 315 can be any interface which enables data to be exchanged between the second installation 300 and a user apparatus 100, on the one hand, and the second installation 300 and the first installation 200, on the other hand. It can again be a wireless interface or a wired interface. Of course, two different interfaces can also be provided for the communication with the user an apparatuses and the first installation.

The external memory 320 can be configured to store data of a database. The database can, for example, provide mailboxes for electronic messages for different users. Attachments can optionally be stored separately. These can be encrypted or unencrypted. If they are encrypted, they are encrypted with the public key of a key pair of the mailbox user.

Of course, the installation 300 can equally be assembled in any other way.

The system comprises a program with program instructions for supporting the decryption of encrypted data on the part of the user. The program could be an exemplary embodiment of a program according to the first aspect of the invention.

The program could be installed in the program memory 102. In this case, the program memory 102 could be an exemplary embodiment of a computer-readable storage medium according to the first aspect of the invention and the apparatus 100 or the chip 107 could be an exemplary embodiment of an apparatus according to the invention according to the first aspect.

Alternatively, the program could be an application, for example, which is permanently stored in the program memory 312 or in the main memory 314 of the server 310, and which in each case can be downloaded by the processor 101 via a browser stored in the program memory 102 from the server 310 on demand and stored in the working memory 103. Such an application could, for example, be realized as a Java applet. In this alternative, the program memory 312 or the main memory 314 can be an exemplary embodiment of a computer-readable storage medium according to the first aspect of the invention, and likewise the working memory 103, as long as the application is stored in the working memory 103. The apparatus 100 or the chip 107 could correspondingly be an exemplary embodiment of an apparatus according to the invention according to the first aspect, as long as the application is stored in the working memory 103.

The system also comprises a program with program instructions for supporting the decryption of encrypted data on the part of the server. The program could be an exemplary embodiment of a program according to the second aspect of the invention. It could, for example, be stored in the program memory 212. In this case, the program memory 212 could be an exemplary embodiment of a computer-readable storage medium according to the second aspect of the invention and the server 210 or the plug-in card 217 could be an exemplary embodiment of an apparatus according to the invention according to the second aspect.

The apparatus 100 and installations 200 and 300 from FIG. 1 can be modified in various ways both by omitting components and by adding components. Further or alternative advantages may arise as a result of this.

The functions of the installation 300 of the message deliverer could be implemented, for example, in the applicant's E-POSTBRIEF (E-Post letter) system; the functions of the trust centre could be implemented, for example, in the applicant's Signtrust system which is separate from it; and the provided data could be E-Post letters which can be stored by a sender on a web portal of the E-POSTBRIEF system and retrieved by a recipient there.

Figure 2:
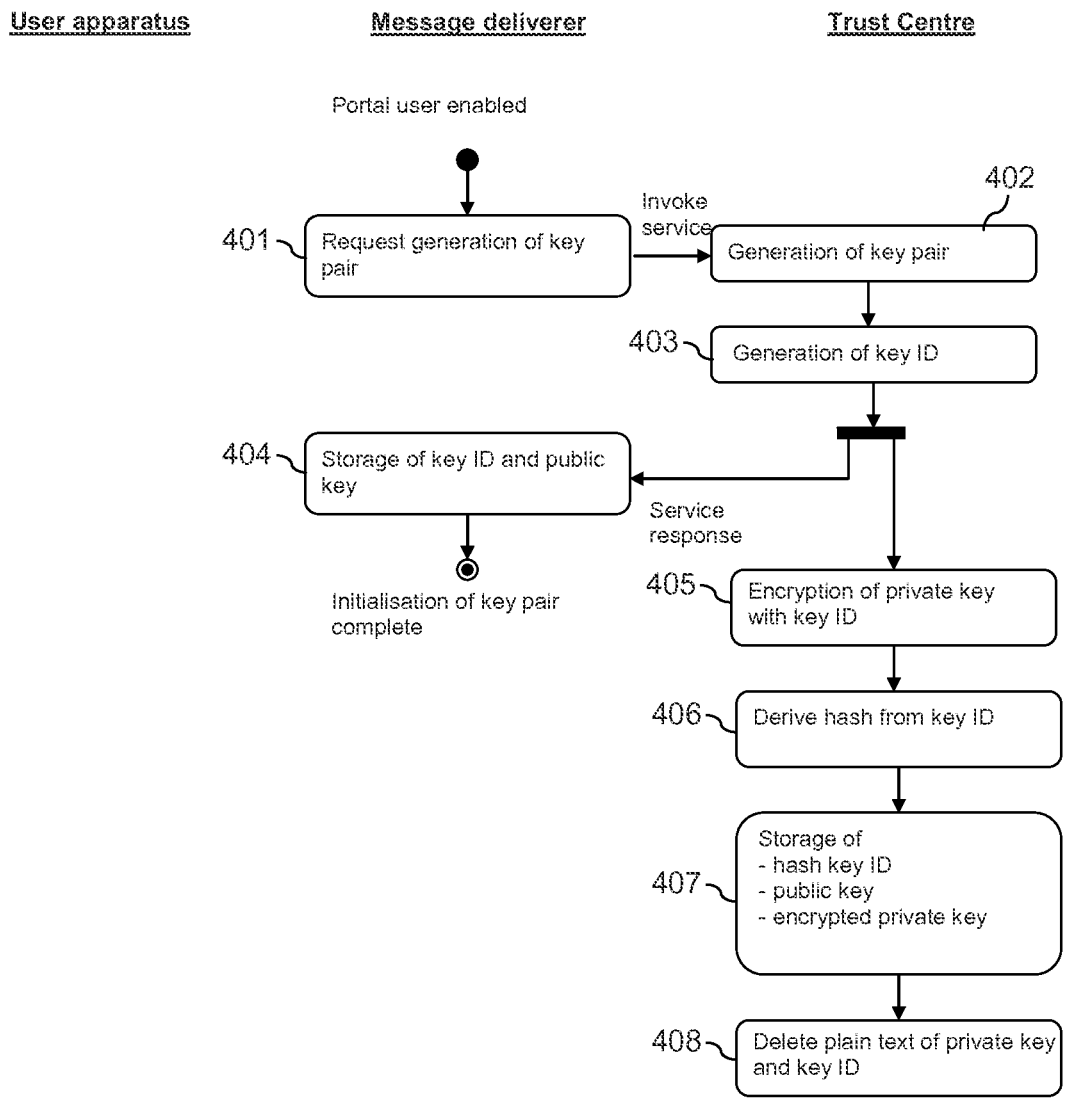
FIG. 2 shows a flowchart with first exemplary method steps in the system from FIG. 1; and, FIG. 3 shows a flowchart with further exemplary method steps in the system from FIG. 1.
Figure 3:
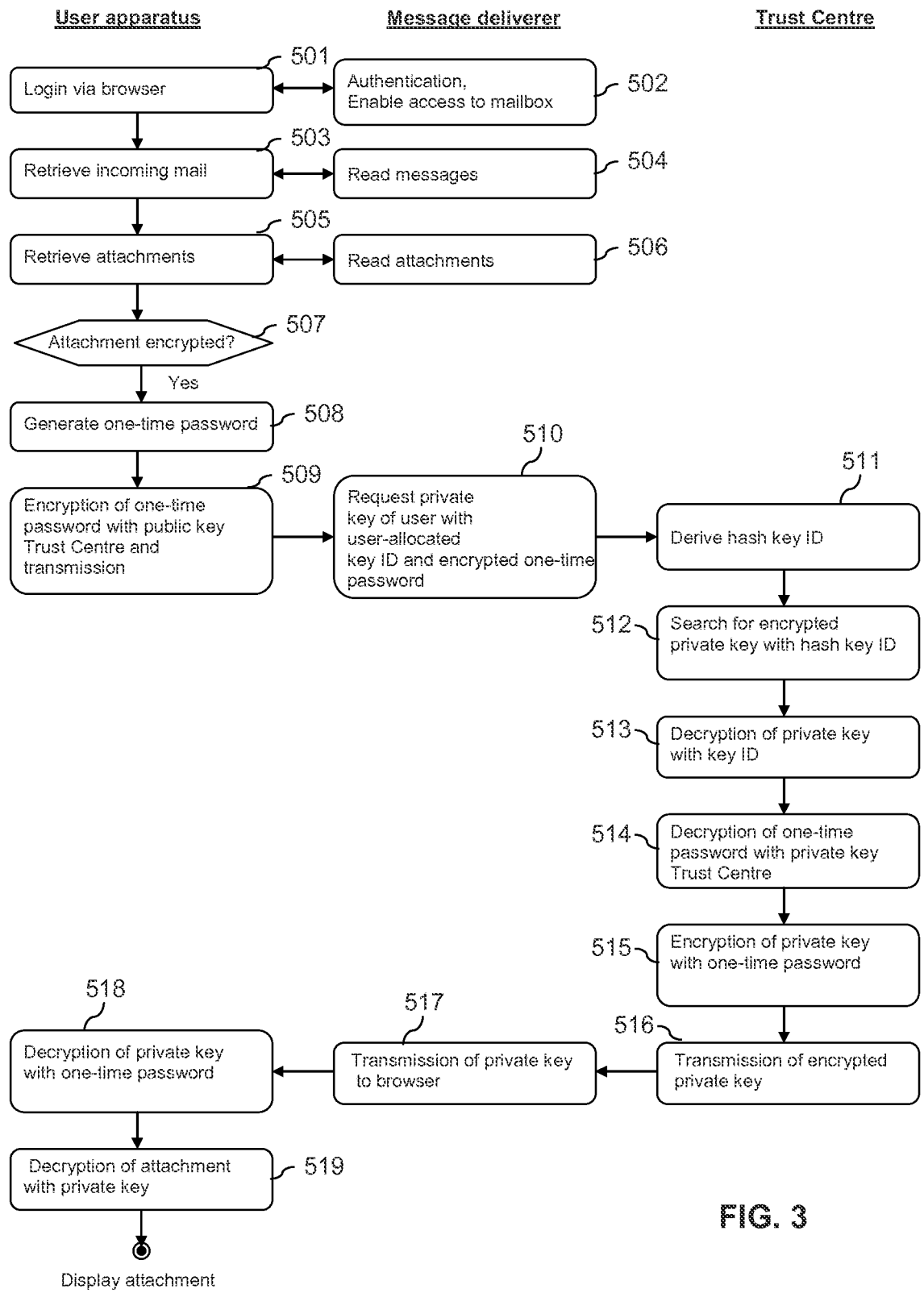

FIGS. 2 and 3 are flowcharts which illustrate exemplary embodiments of methods according to the invention according to the first and second aspects.

The shown actions of the user apparatus 100 are carried out, by way of example, when the processor 101 executes a program loaded via a browser and stored in the working memory 103. The shown actions of the installation 300 of the message deliverer are carried out when the processor 311 retrieves and executes a corresponding program from the program memory 312. The shown actions of the trust centre 200 are carried out when the processor 211 retrieves and executes a corresponding program from the program memory 212. The illustrated communications between the user apparatus 100, the installation 300 of the message deliverer and the trust centre 200 occur via the respective communications interface 105, 315, 215 using the Internet.

FIG. 2 firstly relates to the generation of a private user key according to the second aspect.

The user apparatus 100 is not directly involved here. It simply requests beforehand that the use of a portal is enabled when a user wants to use a service for transmitting electronic messages provided by the message deliverer. The message deliverer enables the use of the portal if all provided conditions have been met and creates a user master data record for the user. The user master data is stored in the main memory 314. It can, for example, contain data for authenticating the user, such as a user name or a message delivery address and a password.

If the requested portal use for a user has been enabled at the message deliverer, then the installation 300 of the message deliverer automatically requests the generation of a key pair for asymmetric encryption at the trust centre (Action 401).

The trust centre 200 as a result generates a key pair for the user without external input by the user or the message deliverer (Action 402). The key pair consists of a private key and a public key, wherein data encrypted using the public key can only be decrypted again using the private key.

In addition, the trust centre 200 generates a unique key identification (key ID) for the generated key pair (Action 403).

The trust centre 200 transmits the key identification and the public key to the installation 300 of the message deliverer, who stores the two values in the user master data for the user in the main memory 314 (Action 404). For the message deliverer, the initialisation of the key pair for the new user is thereby complete.

The trust centre 200 moreover encrypts the private key of the user using the key identification (Action 405).

The trust centre 200 derives a hash value (or hash) from the key identification (Action 406). A perfect hash function is used for this purpose for example, so that a different hash value results for each possible key identification.

The trust centre 200 now stores a new data record in the external memory 220. The data record comprises the hash value of the key identification and allocated to it the public key and the encrypted private key (Action 407).

Finally, the trust centre 200 deletes the plain text of the generated private key and the plain text of the generated key identification (Action 408).

The initialisation of the key pair is thereby also complete at the trust centre 200.

If a sender now wants to transmit an electronic message with an encrypted attachment to the user, then the sender can request the public key of the user from the installation 300. The installation 300 can read the public key of the user, for example by means of a specified user name or a specified delivery address for the user, from the user master data from the main memory 314 and supply it to the sender. The sender can then encrypt a file with the public key of the user, attach it to the message and transmit the message with user addressing to the message deliverer.

All electronic messages, independent of the type of delivery and their contents, within the installation 300 of the message deliverer are allocated to the recipient mailbox and are filed access-protected in the memory 320.

FIG. 3 relates to the retrieval of a message with an encrypted attachment by the user and to the retrieval of a private key, which has already been generated and stored, for decryption.

If a user would like to retrieve incoming mail he/she can log on to the installation 300 of the message deliverer via a browser of the user apparatus 100 (Action 501). The log-in can, for example, comprise the input and transmission of a user name and/or a user delivery address and a password.

The installation 300 subsequently carries out an authentication and, after the user has been successfully authenticated, enables the user to access his/her mailbox (Action 502). The authentication can be based on the user master data stored in the main memory 314. For example, the installation 300 could check whether there is a record for the transmitted user name in the user master data and whether a password is stored for this which corresponds to the transmitted password.

The user apparatus 100 can subsequently retrieve the incoming mail at the installation 300 (Action 503).

The installation 300 reads all new messages for the user in the memory 320 and transmits them to the user apparatus 100 (Action 504). There, the messages can be displayed.

Attachments could be directly read at the same time by the installation 300 and transmitted. Alternatively, provision can be made for the user to arrange for the user apparatus 100 to retrieve the attachments of the displayed messages separately as required (Action 505). In this case, the installation 300 only then reads the selected attachments from the external memory 320 and transmits them to the user apparatus 100 (Action 506). The browser of the user apparatus 100 can hold available a representation of the file in the working memory 103.

The user apparatus 100 now checks whether one of the received attachments is encrypted (Action 507). If this is not the case, then the content of the attachment can be immediately output, for example via a display, if the attachment is text and/or image data.

If the attachment is encrypted, then the user apparatus 100 firstly requires the user's private key to decrypt it. This is not stored in the user apparatus 100.

For this purpose, the user apparatus 100 generates a random key for symmetric encryption, which is used as a one-time password or transport-PIN (Personal Identification Number) (Action 508). The one-time password can be generated automatically and without involvement of the user and held available in the working memory 103.

The user apparatus 100 encrypts the one-time password with a public key of the trust centre 200 and transmits it to the installation 300 of the message deliverer (Action 509). The public key can be permanently stored in the main memory 104 of the user apparatus 100, for example. However, it can also be stored in the main memory 314 of the message deliverer, for example, and made available to the user apparatus 100 via the browser. This could occur automatically, for example, if after a log-in a first attachment is retrieved. The user apparatus 100 could then hold the public key of the trust centre temporarily available in the working memory 103, as long as the user is logged on at the message deliverer.

The transmission of the one-time password to the message deliverer can take place together with a request to retrieve the private key of the user from the trust centre, wherein the request can be in the form of a pre-specified parameter value. Alternatively, the transmission of the one-time password can, however, also implicitly contain the request, for example because the transmission takes place in a certain message or at a certain relative point in time in the communication between the user apparatus 100 and the installation 300 of the message deliverer.

In the installation 300, the key identification allocated to the user in the user master data is read from the main memory 314 and together with the encrypted one-time password passed on to the trust centre 200, in order to request the private key of the user (Action 510).

The trust centre 200 derives a hash value from the key identification (Action 511). The same hash function is used as in Action 406 from FIG. 2 for this purpose.

The trust centre 200 searches for an encrypted private key of the user in the memory 220, which is allocated to the hash value (Action 512).

The trust centre 200 decrypts the private key of the user using the key identification (Action 513).

The trust centre 200 also reads the private key of the trust centre from the main memory 214 and decrypts the received one-time password using the private key of the trust centre 200 (Action 514).

The trust centre 200 can now encrypt the decrypted private key of the user with the encrypted one-time password (Action 515). The received key identification and the decrypted private password of the user can now be deleted again in the trust centre 200.

The encrypted private key is conveyed from the trust centre 200 to the installation 300 of the message deliverer (Action 516).

The installation 300 of the message deliverer transmits the encrypted private key to the browser of the user apparatus 100 (Action 517).

Within the browser of the user apparatus 100, the encrypted private key of the user can now be decrypted by means of the one-time password stored in the working memory 103 (Action 518).

The private key of the user is now available in plain text in the browser and the encrypted attachment stored in the working memory 103 can now be decrypted using this private key (Action 519).

The content of the decrypted attachment can then, according to the user requirement, be stored in the main memory 104 and/or output via the user interface 106, for example by displaying it on a display.

The one-time password, the encrypted attachments and the private key of the user can be deleted in the working memory 103 when all the encrypted attachments present have been decrypted and/or when the user logs off from the message deliverer via the browser.

Apart from the user logging on to the message deliverer, the method from FIG. 3 could take place without any user input. It could be carried out in a fully hidden and automatic manner. That is to say, the user would not be able to recognise whether an electronic message had an unencrypted attachment or an encrypted attachment. However, in order to indicate to the user the distinctiveness of the received message and boost user confidence in the method, provision can be made to make the decryption procedure and its outcome clearly visible to the recipient.

The actions of the user apparatus 100 in FIG. 3 represent an exemplary embodiment of a method according to the first aspect of the invention. The actions of the trust centre 200 in FIGS. 2 and 3 represent an exemplary embodiment of a method according to the second aspect of the invention.

In exemplary embodiments of the invention, the key generation in the trust centre 200 is therefore anonymous. Here, the allocation of a key to a user is not known and with the use of a hash function or another cryptographic derivation even the allocation of a key identification to an encrypted private key exists only temporarily. Local reconstruction of the key identification in the trust centre 200 and hence of the decryption of the private keys of users is not possible. In addition, the private key (in encrypted form) is exclusively stored in the trust centre 200. Thus, key administration and data storage are separated from one another, so that it is guaranteed that no party can independently obtain access to keys and data. For a potential hacker, this means that he/she must be able to successfully hack into at least two of the three parties and access the data, in order to be able to decrypt an encrypted message.

Additionally, all data both in the installation 300 of the message deliverer and in the trust centre 200 can be stored encrypted throughout with additional system keys, so that a hacker would also have to gain control of these. In the browser of the user apparatus 100, in certain embodiments there is no data persistence at all. This means that a potential hacker would also here only be able to try to access data in the browser during runtime. For the actual transmission of data in the system, any other security measures can be provided, such as a secure data transmission by means of the Transport Layer Security (TLS) protocol within the framework of a HyperText Transfer Protocol Secure (HTTPS) application.

Planning and organisational measures are not required by the recipient, since all required means can be provided via a browser.

Since the private key is retrieved by means of a one-time password as a transport-PIN, which is generated independently of a user password, the approach is also independent of the login procedure used. This means that no measures have to be provided, so that the user password, which during the login is ultimately transmitted to the message deliverer, is firstly modified in such a way that the message deliverer can draw no inferences about the transport-PIN.

Of course, the illustrated and described methods can be modified in various ways within the scope of the invention, by adding, omitting, varying and exchanging individual actions. Thus, for example, Actions 513 and 514 could also be carried out in reverse order or in parallel to one another. Furthermore, the application of a hash function with regard to the key identification in Actions 406 and 511 could be dispensed with, for example. The key identification could then in Action 407 also be stored in the trust centre in plain text and in Action 512 used in plain text to search for the private key. In addition, the method can not only be used for attachments of electronic messages. It could also be used when the message itself is to be encrypted.

The approach presented here by way of example, could also be used for services other than a message delivery service. A second installation—similar to the installation 300—could, for example, belong to a database provider which stores data for users on the net. In this case, a first installation—for example a trust centre again—could optionally, instead of an asymmetric key pair, also generate a symmetric key for a user and hold it available as a secret key. This can take place in essentially the same way as illustrated in FIG. 2. Here, instead of the private key of the key pair only a key for symmetric encryption is then generated, encrypted and stored and the generation, transmission and storage of the public key is completely dispensed with. The user apparatus could then, each time when stored encrypted data is read, retrieve the key for symmetric encryption stored in the first installation, in order to decrypt the data in the user apparatus. This can take place in essentially the same way as illustrated in FIG. 3. Here, instead of messages and attachments, only data is retrieved by the user apparatus from a memory in the second installation and instead of the private key of the user a key of the user for symmetric encryption is used. The user apparatus could then also each time when data for storing in the second installation is to be encrypted firstly similarly retrieve the key stored in the first installation for the symmetric encryption.

The illustrated or described connections between components are to be understood as functional connections. They can be realized directly or indirectly via a plurality of other components. The described actions can be implemented in a variety of ways; thus implementation is conceivable not only in software terms (by means of program instructions) but also only in hardware terms or in terms of a combination of the two. Each of the illustrated components can also be formed by a plurality of components. Thus, instead of each processor a plurality of processors could also be used and instead of each memory component a plurality of memory components could be used. A plurality of processors and/or a plurality of memory components could also be distributed on a plurality of servers of a respective installation.

Of course, the described embodiments are only examples which within the scope of the claims can be modified and/or supplemented in various ways. In particular, each feature which has been described for a certain exemplary embodiment can be used independently or in combination with other features in any other exemplary embodiment. Each feature which has been described for an exemplary embodiment of a certain category can also be correspondingly used in an exemplary embodiment of another category.

The invention claimed is:

1. A method performed by an apparatus, wherein a first installation is configured to provide a secret key of a user of the apparatus, and wherein a second installation is configured to provide data for the user, the method comprising:
  logging on to the second installation with authentication of the user,
  receiving encrypted data from the second installation,
  creating a one-time password,
  encrypting the one-time password by means of a public key of the first installation,
  transmitting the encrypted one-time password to the second installation and causing the second installation to retrieve the secret key of the user from the first installation by means of the encrypted one-time password and a key identification allocated to the user in the second installation,
  receiving the secret key of the user, which was encrypted by the first installation with the one-time password, from the second installation,
  decrypting the secret key of the user by means of the one-time password and
  decrypting the encrypted data by means of the secret key of the user.

2. The method according to claim 1, wherein the one-time password is created automatically, when it is determined that encrypted data has been received from the second installation.

3. The method according to claim 1, wherein the apparatus is caused to perform the method one of
  by program instructions stored in a local memory of the apparatus and executed by a processor of the apparatus or
  by program instructions received via a browser and executed by a processor of the apparatus.

4. An apparatus comprising at least one processor and at least one memory with a program, the at least one memory and the program configured to, with the at least one processor, cause the apparatus to perform the following:
  log on to a second installation with authentication of a user, wherein a first installation is configured to provide a secret key of the user of the apparatus, and wherein the second installation is configured to provide data for the user,
  receive encrypted data from the second installation,
  create a one-time password,
  encrypt the one-time password by means of a public key of the first installation,
  transmit the encrypted one-time password to the second installation and cause the second installation to retrieve the secret key of the user from the first installation by means of the encrypted one-time password and a key identification allocated to the user in the second installation,
  receive the secret key of the user, which was encrypted by the first installation with the one-time password, from the second installation,
  decrypt the secret key of the user by means of the one-time password and
  decrypt the encrypted data by means of the secret key of the user.

5. The apparatus according to claim 4, wherein the at least one memory and the program are configured to cause the apparatus to create the one-time password automatically, when it is determined that encrypted data has been received from the second installation.

6. The apparatus according to claim 4, wherein the apparatus is one of a device or a module for a device.

7. A non-transitory computer-readable storage medium which stores a program comprising program instructions, wherein the program instructions when executed by a processor cause an apparatus to perform the following:
  log on to a second installation with authentication of a user, wherein a first installation is configured to provide a secret key of the user of the apparatus, and wherein the second installation is configured to provide data for the user,
  receive encrypted data from the second installation,
  create a one-time password,
  encrypt the one-time password by means of a public key of the first installation,
  transmit the encrypted one-time password to the second installation and cause the second installation to retrieve the secret key of the user from the first installation by means of the encrypted one-time password and a key identification allocated to the user in the second installation,
  receive the secret key of the user, which was encrypted by the first installation with the one-time password, from the second installation,
  decrypt the secret key of the user by means of the one-time password and
  decrypt the encrypted data by means of the secret key of the user.

8. A method performed by an apparatus of a first installation, wherein a second installation is configured to provide data for a user, the method comprising:
  receiving a key identification and a one-time password, which was generated by an apparatus of a user and encrypted with a public key of the first installation, from the second installation which stores an allocation between users and key identifications,
  reading a secret key of the user, which is encrypted with the key identification, based on the received key identification from a memory of the first installation,
  decrypting the encrypted secret key of the user by means of the key identification,
  decrypting the encrypted one-time password by means of a private key of the first installation,
  encrypting the secret key of the user with the one-time password and
  transmitting the secret key of the user encrypted with the one-time password to the second installation for passing on to the apparatus of the user, in order to enable the user to decrypt encrypted data received from the second installation.

9. The method according to claim 8, further comprising cryptographically deriving a value from the received key identification, wherein the secret key of the user encrypted with the key identification is stored in the memory of the first installation with an allocation to a value cryptographically derived from the key identification, and wherein reading the secret key of the user encrypted with the key identification is based on the cryptographically derived value of the received key identification.

10. The method according to claim 8, wherein the secret key is one of
  a private key of a key pair for asymmetric encryption or
  a key for symmetric encryption.

11. A method performed by an apparatus of a first installation, wherein a second installation is configured to provide data for a user, the method comprising:
  receiving a key identification and a one-time password, which was generated by an apparatus of a user and encrypted with a public key of the first installation, from the second installation which stores an allocation between users and key identifications, reading a secret key of the user, which is encrypted with the key identification, based on the received key identification from a memory of the first installation, decrypting the encrypted secret key of the user by means of the key identification, decrypting the encrypted one-time password by means of a private key of the first installation, encrypting the secret key of the user with the one-time password and transmitting the secret key of the user encrypted with the one-time password to the second installation for passing on to the apparatus of the user, in order to enable the user to decrypt encrypted data received from the second installation, wherein a stored, encrypted secret key of a user is generated beforehand by the apparatus of the first installation as follows:

receiving a request from the second installation to generate a secret key for a user, generating a secret key for a user independent of a user input, generating a key identification for the secret key for the user, encrypting the secret key for the user with the key identification and storing the encrypted secret key in the memory of the first installation for retrieval by an apparatus of the user via the second installation.

12. The method according to claim 11, further comprising:

sending the key identification to the second installation for storage of the key identification with an allocation to a user.

13. The method according to claim 11, further comprising:

cryptographically deriving a value from the generated key identification, storing the cryptographically derived value in the memory of the first installation with an allocation to the secret key encrypted with the key identification and deleting the key identification in the first installation.

14. The method according to claim 11, wherein the secret key is a private key of a key pair for asymmetric encryption, further comprising generating a public key for the user and one of storing the public key in the first installation only, or transmitting the public key to the second installation for storage in the second installation only, or storing the public key in the first installation and transmitting the public key to the second installation for storage in the second installation.

15. The method according to claim 8, wherein the encrypted data was one of encrypted by a third party apparatus and made available to the second installation, or encrypted by a user apparatus and made available to the second installation.

16. An apparatus of a first installation, wherein a second installation is configured to provide data for a user, the apparatus comprising at least one processor and at least one memory with a program, the at least one memory and the program configured to, with the at least one processor, cause the apparatus to perform the following:

receive a key identification and a one-time password, which was generated by an apparatus of a user and encrypted with a public key of the first installation, from the second installation which stores an allocation between users and key identifications, read a secret key of the user, which is encrypted with the key identification, based on the received key identification from a memory of the first installation, decrypt the encrypted secret key of the user by means of the key identification, decrypt the encrypted one-time password by means of a private key of the first installation, encrypt the secret key of the user with the one-time password and transmit the secret key of the user encrypted with the one-time password to the second installation for passing on to the apparatus of the user, in order to enable the user to decrypt encrypted data received from the second installation.

17. The apparatus according to claim 16, wherein the at least one memory and the program are further configured to cause the apparatus to cryptographically derive a value from the received key identification, wherein the secret key of the user encrypted with the key identification is stored in the memory of the first installation with an allocation to a value cryptographically derived from the key identification, and wherein reading the secret key of the user encrypted with the key identification is based on the cryptographically derived value of the received key identification.

18. The apparatus according to claim 16, wherein the secret key is one of a private key of a key pair for asymmetric encryption or a key for symmetric encryption.

19. An apparatus of a first installation, wherein a second installation is configured to provide data for a user, the apparatus comprising at least one processor and at least one memory with a program, the at least one memory and the program configured to, with the at least one processor, cause the apparatus to perform the following:

receive a key identification and a one-time password, which was generated by an apparatus of a user and encrypted with a public key of the first installation, from the second installation which stores an allocation between users and key identifications, read a secret key of the user, which is encrypted with the key identification, based on the received key identification from a memory of the first installation, decrypt the encrypted secret key of the user by means of the key identification, decrypt the encrypted one-time password by means of a private key of the first installation, encrypt the secret key of the user with the one-time password and transmit the secret key of the user encrypted with the one-time password to the second installation for passing on to the apparatus of the user, in order to enable the user to decrypt encrypted data received from the second installation, wherein the at least one memory and the program are further configured to cause the apparatus to generate beforehand a stored, encrypted secret key of a user as follows:

receive a request from the second installation to generate a secret key for a user, generate a secret key for a user independent of a user input, generate a key identification for the secret key for the user, encrypt the secret key for the user with the key identification and store the encrypted secret key in the memory of the first installation for retrieval by an apparatus of the user via the second installation.

20. The apparatus according to claim 19, wherein the at least one memory and the program are further configured to cause the apparatus to:
send the key identification to the second installation for storage of the key identification with an allocation to a user.

21. The apparatus according to claim 19, wherein the at least one memory and the program are further configured to cause the apparatus to:
cryptographically derive a value from the generated key identification,
store the cryptographically derived value in the memory of the first installation with an allocation to the secret key encrypted with the key identification and
delete the key identification in the first installation.

22. The apparatus according to claim 19, wherein the secret key is a private key of a key pair for asymmetric encryption, and wherein the at least one memory and the program are further configured to cause the apparatus to generate a public key for the user and one of
store the public key in the first installation only or
transmit the public key to the second installation for storage in the second installation only or
store the public key in the first installation and transmitting the public key to the second installation for storage in the second installation.

23. The apparatus according to claim 16, wherein the encrypted data was one of
encrypted by a third party apparatus and made available to the second installation, or
encrypted by a user apparatus and made available to the second installation.

24. The apparatus according to claim 16, wherein the apparatus is one of a server or a module for a server.

25. A non-transitory computer-readable storage medium which stores a program comprising program instructions, wherein the program instructions when executed by a processor cause an apparatus of a first installation to perform the following:
receive a key identification and a one-time password, which was generated by an apparatus of a user and encrypted with a public key of the first installation, from a second installation, wherein the second installation stores an allocation between users and key identifications and wherein the second installation is configured to provide data for a user,
read a secret key of the user, which is encrypted with the key identification, based on the received key identification from a memory of the first installation,
decrypt the encrypted secret key of the user by means of the key identification,
decrypt the encrypted one-time password by means of a private key of the first installation,
encrypt the secret key of the user with the one-time password and
transmit the secret key of the user encrypted with the one-time password to the second installation for passing on to the apparatus of the user, in order to enable the user to decrypt encrypted data received from the second installation.

26. A system comprising a first installation having an apparatus and a memory for storing a plurality of secret keys of users encrypted with key identifications, as well as a second installation configured to provide data for a user, the apparatus of the first installation comprising at least one processor and at least one memory with a program, the at least one memory and the program configured to, with the at least one processor, cause the apparatus to perform the following:
receive a key identification and a one-time password, which was generated by an apparatus of a user and encrypted with a public key of the first installation, from the second installation which stores an allocation between users and key identifications,
read a secret key of the user, which is encrypted with the key identification, based on the received key identification from a memory of the first installation,
decrypt the encrypted secret key of the user by means of the key identification,
decrypt the encrypted one-time password by means of a private key of the first installation,
encrypt the secret key of the user with the one-time password and
transmit the secret key of the user encrypted with the one-time password to the second installation for passing on to the apparatus of the user, in order to enable the user to decrypt encrypted data received from the second installation.

* * * * *